J. GARDNER.
Capstans.

No. 148,605.   Patented March 17, 1874.

Witnesses,
Chas H. Smith
Harold Serrell

Inventor
John Gardner,
per Lemuel W. Serrell
atty.

UNITED STATES PATENT OFFICE.

JOHN GARDNER, OF NEW YORK, N. Y.

IMPROVEMENT IN CAPSTANS.

Specification forming part of Letters Patent No. 148,605, dated March 17, 1874; application filed February 17, 1874.

*To all whom it may concern:*

Be it known that I, JOHN GARDNER, of the city and State of New York, have invented an Improvement in Capstans, of which the following is a specification:

This invention is made for giving two speeds to a capstan actuated by a horizontal shaft in the head and cranks at the ends of the shaft.

I provide double gearing on the capstan and shaft, and mount the shaft so that it may be moved endwise. The larger gear on the shaft, when in operation, gears into a wheel upon the capstan that is smaller than the wheel into which the smaller gear or pinion on the shaft gears, so that the slowest motion and greatest purchase are communicated from the shaft and pinion to the largest gear upon the capstan; and when the shaft is moved endwise these gears are separated, and the larger miter-gear on the shaft is brought into mesh with the smaller gear on the capstan. Thereby the speed of the capstan will be greater relatively to that of the crank-shaft, and the power exerted will be proportionately less. This is adapted to taking up slack rope before the article is moved.

Figure 3:
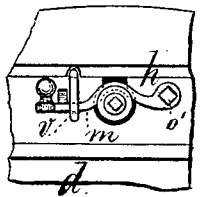
Figure 1:
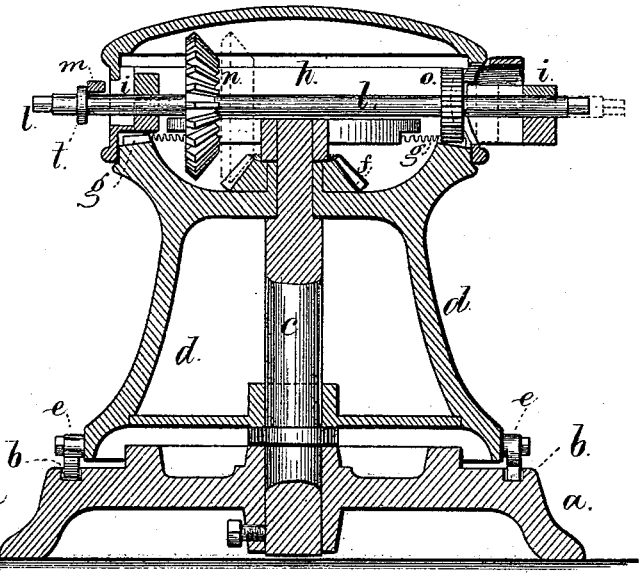
Figure 2:
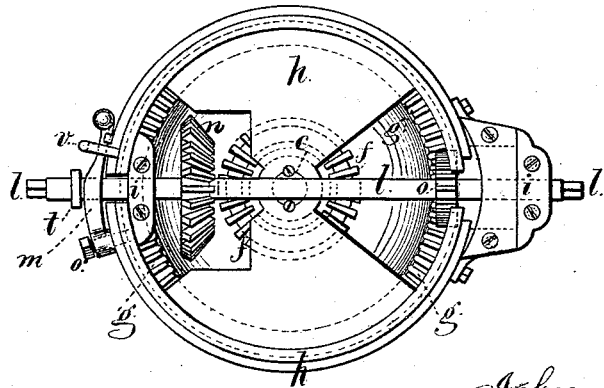

In the drawing, Figure 1 is a vertical section of the capstan. Fig. 2 is a plan of the same, with the cover to the capstan-head removed; and Fig. 3 is an elevation of the clutch-hook.

The base $a$ of the capstan is of suitable size, having the ratchet-wheel $b$ or pawl-bed, as usual, around its upper edge, and in the center is the vertical shaft $c$, surrounded by the capstan-barrel $d$, with the pawls $e$, as usual. At the head of the capstan are the gear-wheels $f$ and $g$, cast upon, or permanently connected to, the upper end, and above the capstan-barrel is the head $h$, that is firmly connected to the vertical shaft $c$, and sustains the horizontal shaft $l$ within the bearings or boxes $i$ $i$. This shaft $l$ is squared at the ends to receive the crank-arms, and upon the said shaft $l$ are the gear-wheels $n$ $o$. When the shaft is in the position shown, the gears $o$ and $g$ work together, and the rotation of the capstan is comparatively slow; but when the shaft $l$ is moved endwise, the gear $n$ meshes into the gear $f$, as shown by dotted lines, Fig. 1, and the capstan is revolved nearly as fast as the cranks, so that the parts may be turned with rapidity for taking up the slack. When the speed is to be changed, the shaft $l$ is slipped either one way or the other, and retained by the coupling-hook $m$, that swings upon the pin or screw $o'$, and passes at either one side of the collar $t$ or the other. The loop or guide-bar $v$ retains the moving end.

I claim as my invention—

The horizontal shaft $l$ in the stationary capstan-head $h$, and provided with the two gears $n$ and $o$, of different size, in combination with the capstan $d$, with the gears $f$ and $g$ at the upper end, and means for retaining the shaft $l$ when moved endwise to bring one pair of gears together and disconnect the other pair, as specified.

Signed by me this 12th day of February, A. D. 1874.

JOHN GARDNER.

Witnesses:
GEO. T. PINCKNEY,
CHAS. H. SMITH.